Figure 1:
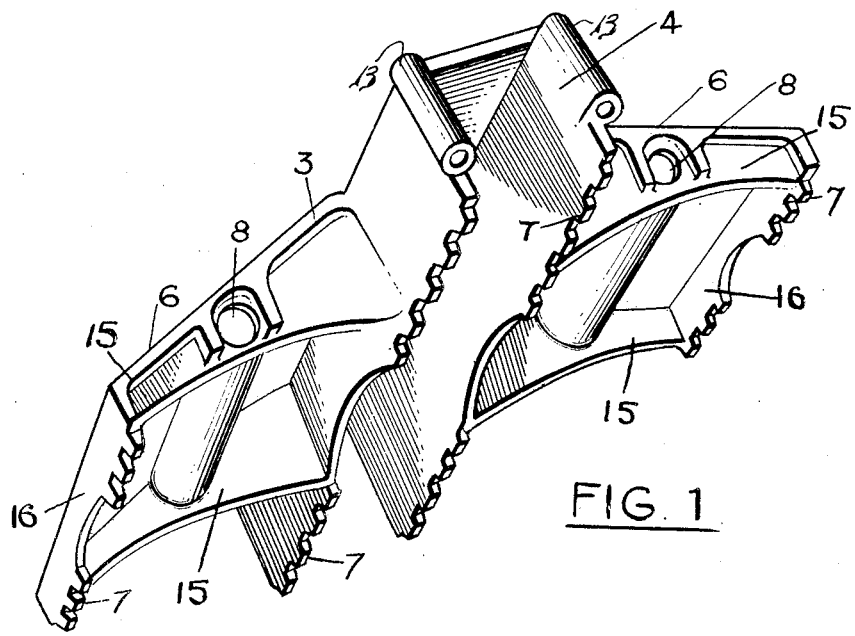

July 18, 1939.    G. A. BAINBRIDGE    2,166,516
RAMP FOR THE PROTECTION OF HOSE PIPES
Filed Nov. 26, 1937

INVENTOR
GEORGE A. BAINBRIDGE
per
Norman S. Barlow
Attorney

Patented July 18, 1939

2,166,516

UNITED STATES PATENT OFFICE 2,166,516

RAMP FOR THE PROTECTION OF HOSE PIPES

George Allen Bainbridge, Cardiff, Wales

Application November 26, 1937, Serial No. 176,598
In Great Britain December 1, 1936

2 Claims. (Cl. 104—275)

This invention comprises improvements in or relating to ramps for the protection of hose pipes and has for its object to provide a ramp which is simple in construction, but at the same time capable of withstanding the weight of the normal vehicular traffic which would be likely to pass over same. The ramp can be readily placed in position and picked up again when not required, whilst it can be easily packed away when not in use.

The invention is particularly adapted for use by fire brigades for the protection of a line or lines of hose, which often have to be carried across a road owing to the position of the water hydrant in relation to the fire, thus necessitating the diversion of the traffic, unless the hose pipe can be adequately and quickly protected, which can be done with this invention.

Figure 2:
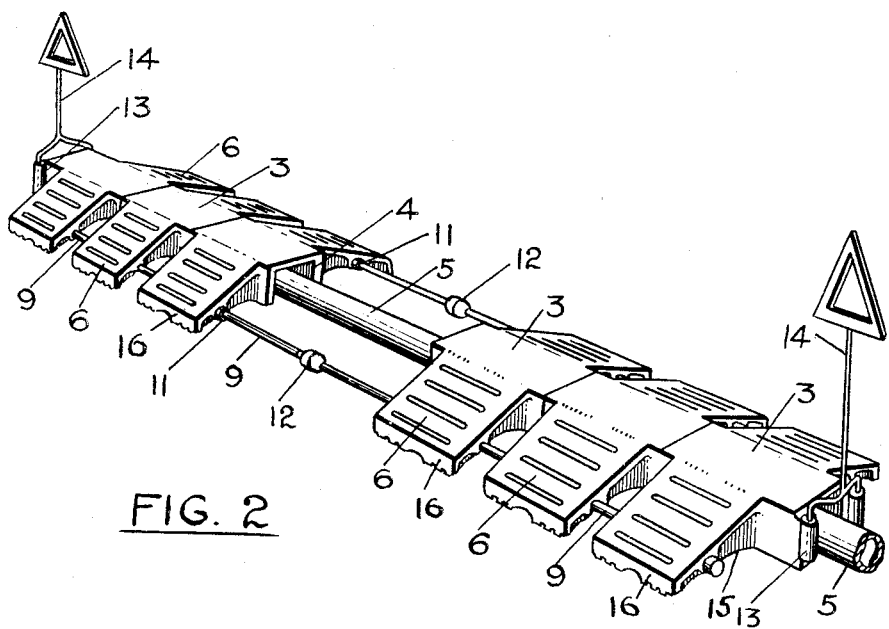

Referring to the drawing:

Figure 1 is an underside perspective view of one of the end sections of a ramp according to this invention, whilst, Figure 2 is a perspective view of a series of sections connected together to protect a hose pipe and form a ramp.

In carrying the present invention into practice as shown upon the accompanying drawing, the ramp is preferably built up of a series of sections 3 which are preferably cast from aluminium or other light alloy, such sections comprising an inverted channel portion 4 which is adapted to be placed over and protect the hose pipe 5.

The approach to the inverted channel portion 4 is by inclines 6 which are formed integral with and on each side of the channel portion 4, thus forming a ramp which the road vehicle wheels can easily negotiate.

The inclined surfaces 6 are provided with supporting webs 15 on their underside, whilst the outer ends of said inclined surfaces 6 are formed with a depending wall 16, the lower edge of which together with the lower edges of the inverted channel portion 4 are formed with serrations 7 which facilitate the sections gripping the road or like surface.

The length of the inverted channel portion 4 is greater than that of the inclines 6, so when two sections 3 abut, the distance between the two adjacent edges of the inclines 6 is not of a sufficient width to allow the tyre of an ordinary road vehicle to pass between. By this arrangement weight is saved in material used which is an important factor when such ramps have to be carried about by a fire brigade.

Each section 3 is provided on either side with a hole 8 through which is passed a tie rod 9.

It will be seen that in order to reduce the number of sections it is necessary to carry, particularly when used by a fire brigade, they need only be disposed where the vehicle wheels need pass, thus leaving a gap in the centre of the sections as shown in Figure 2.

The sections 3 are threaded onto the tie rods 9 until they abut against stops 11, the adjacent section 3 abutting against each other and forming a continuous surface on the top, for the vehicle wheels. These sections are then secured together by suitable locking means such as nuts screwing onto the outer ends of the two tie rods 9.

The tie rods 9 at their centres are provided with a ball or other form of universal joint 12 which permits of the two sets of sections 3 following any camber that there may be on the road surface.

On the outer end sections 3, lugs 13 are provided into which are slidably fitted the upright members 14, which at their lower ends run horizontal and outwards to give clearance for wheel projections. These upright members 14 are not reversible, thus preventing the shortening of the extreme limits of the ramp. To the upper end of the members 14 are attached warning signals as shown which are coloured red. When the ramp is used at night, the signals shown are replaced by lamps showing a red light, thus indicating the extreme limits of the ramp.

The entrance to the inverted channels of the two extreme sections 3 of the ramp are preferably slightly flared so as to avoid chafing of the hose pipe.

The inverted channel portion 4 can be made of a greater width to that shown in the drawing in order to accommodate a plurality of lines of hose pipes if so desired.

I claim:

1. A ramp for the protection of hose pipes consisting of a plurality of sections which are adapted to abut one another, each section comprising an integral unit having in combination an inverted channel portion through which the hose pipe passes, inclined surfaces extending from the upper edges of the inverted channel portion on each side to a level substantially equal to the lower edges of the inverted channel portion, rods extending through said sections to lock same together, stops positioned on said rods, locking means on said rods and a flexible joint in said rods to permit of the sections following the road camber.

2. A ramp section for the proctection of hose pipes comprising an integral unit consisting in combination of an inverted channel portion through which the hose pipe passes, an inclined portion positioned on each side of and at right-angles to the inverted channel portion to form a wheel track, inverted channel portion parts which extend beyond each side of the inclined portions to provide a maximum length of protection for the hose commensurate with the maximum width of wheel track with a minimum weight, a depending wall at the lower end of the inclined portions and serrations formed on the lower edges of the channel portion and the depending walls.

GEORGE ALLEN BAINBRIDGE.